United States Patent [19]
Nokihara

[11] Patent Number: 5,288,464
[45] Date of Patent: Feb. 22, 1994

[54] SOLID-PHASE SYNTHESIZER

[75] Inventor: Kiyoshi Nokihara, Uji, Japan

[73] Assignee: Shimadzu Corporation, Kyoto, Japan

[21] Appl. No.: 933,675

[22] Filed: Aug. 24, 1992

[30] Foreign Application Priority Data

Aug. 24, 1991 [JP] Japan .................................. 3-237153

[51] Int. Cl.$^5$ ........................... B01L 3/00; B01L 11/00
[52] U.S. Cl. ..................................... 422/101; 210/436;
210/496; 422/102; 422/129; 435/287; 935/88
[58] Field of Search ................... 604/190, 126, 82, 83,
604/85; 422/101, 102, 111; 935/88; 210/436,
946, 457, 496; 435/287

[56]        References Cited
        U.S. PATENT DOCUMENTS

| | | | |
|---|---|---|---|
| 1,931,895 | 10/1933 | Grote et al. | 422/101 X |
| 2,136,170 | 11/1938 | Luertzing | 422/101 X |
| 3,557,077 | 9/1967 | Brunfeld et al. | 935/88 X |
| 4,203,840 | 5/1980 | Stoeppler et al. | 422/101 X |
| 4,448,206 | 5/1984 | Martell | 422/101 X |
| 4,476,017 | 10/1984 | Scharff et al. | 210/94 |
| 4,787,971 | 11/1988 | Donald | 422/101 X |
| 4,836,917 | 6/1989 | Tomita et al. | 210/104 |
| 5,039,488 | 8/1991 | Kohr | 935/88 X |
| 5,043,082 | 8/1991 | Hermann, Jr. et al. | 422/101 X |

FOREIGN PATENT DOCUMENTS 0256676   7/1987  European Pat. Off. .
8808872   7/1988  Fed. Rep. of Germany .
4005518A1 8/1991  Fed. Rep. of Germany .

OTHER PUBLICATIONS

Chemical Abstracts, 115:88707n.
Kirk-Othmer, Concise Encyclopedia of Chemical Technology, John Wiley & Sons, pp. 236 & 563.
"Solid Phase Synthesis" by Bruce Merrifield, pp. 341-347.

Primary Examiner—Robert J. Warden
Assistant Examiner—Amalia L. Santiago
Attorney, Agent, or Firm—Birch, Stewart, Kolasch & Birch

[57]             ABSTRACT

The present invention is directed to a solid-phase synthesizer using a reaction vessel which comprises a polyalkylene filter or ceramic filter packed in the bottom portion thereof. The reaction vessel used in the solid-phase synthesizer of the present invention can be used as a disposable reaction vessel. The reaction vessel in the present invention is free of resin adherence to the reaction vessel wall when the solid-phase resin is packed in the reaction vessel, as seen in conventional glass reaction vessels, and it requires no pretreatment such as acid treatment because clogging does not occur because of the use of a polymeric resin instead of a glass filter.

4 Claims, 1 Drawing Sheet

SOLID-PHASE SYNTHESIZER

FIELD OF THE INVENTION

The present invention relates to a solid-phase synthesizer, more specifically to a reaction vessel used in simple automated stepwise synthesizers for peptide synthesis, DNA synthesis and other syntheses.

BACKGROUND OF THE INVENTION

Traditionally, glass reaction vessels packed with a glass filter therein have been used in automated stepwise synthesizers for peptide synthesis and other syntheses.

Various apparatuses are now commercially available for peptide synthesis by ordinary solid-phase methods. However, none of them is a peptide synthesizer; they are all apparatuses for production of protected peptide resin, resin being bound with an elongating side-chain-protected amino acid via peptide bond. Usually, synthesis proceeds automatically in the apparatus until this stage; however, cleavage, including deprotection, is essential to finally remove the desired peptide, which process is now carried out manually. Specifically, the produced protected peptide resin is removed from the reactor and then usually subjected to cleavage in a glass reaction vessel packed with a glass filter therein.

However, in such reaction vessels, which comprise a glass container and a glass filter placed therein, a problem arises because of the necessity for a pretreatment such as chromic acid mixture treatment or heat treatment at about 600° C. before peptide synthesis has been achieved because the peptides are prone to adsorption on the glass wall or cause filter clogging. Moreover, such conventional glass reaction vessels are expensive so that they are not economically advantageous.

Also, in glass reaction vessels, another problem of troublesome operation has been noted out, e.g., a silicon coating treatment is needed before reaction particularly when a solid-phase resin is used, because the resin adheres on the upper wall due to static electricity etc. so that the reaction cannot be uniformly carried out, which results in incomplete synthesis.

In the case of small-scale synthesis involving a small amount of resin, i.e., synthesized peptide resin, resin transfer from the reaction vessel to another cleavage vessel at the time of cleavage causes mechanical loss, which leads to reduction in yield. If the reaction vessel is washed for the purpose of co-washing after cleavage to prevent such loss, additional procedures such as concentration are required after the cleavage reaction. On the other hand, even when a scavenger is used, if the mixture resulting from the cleavage reaction is concentrated, attack by an alkyl cation derived from the amino acid side chain protecting group takes place upon acidolysis, which in turn increases by-products, considerably lowers the yield of the desired product and even makes purification impossible.

Although it is a common practice to use a scavenger for the purpose of capturing the cation resulting from cleavage, the cleavage is often conducted again after determining the optimum conditions.

Also, it is a well-known fact that even though the protected peptide resin has been produced efficiently, a side reaction may take place during cleavage, which hampers the obtainment of the desired product or considerably lowers the yield; experience, including trial and error, is very important in this cleavage.

Accordingly, in the relevant industry, there has been demand for the development of a reaction vessel free of such problems for use in solid-phase synthesizers; however, there is currently no satisfactory one.

SUMMARY OF THE INVENTION

It is an object of the present invention to provide a solid-phase synthesizer using a reaction vessel which can be used as a disposable reaction vessel, is free of resin adherence to the reaction vessel wall when the solid-phase resin is packed in the reaction vessel, and requires no pretreatment such as acid treatment.

With the aim of developing a solid-phase synthesizer having a reaction vessel free of the problems arising from the use of a glass filter and the problems arising from being made of glass, the inventors made investigations and developed the present invention.

BRIEF DESCRIPTION OF DRAWINGS

The present invention will become more fully understood from the detailed description given hereinbelow and the accompanying drawing which is given by way of illustration only, and thus, is not limitative of the present invention, and wherein.

Figure 1:
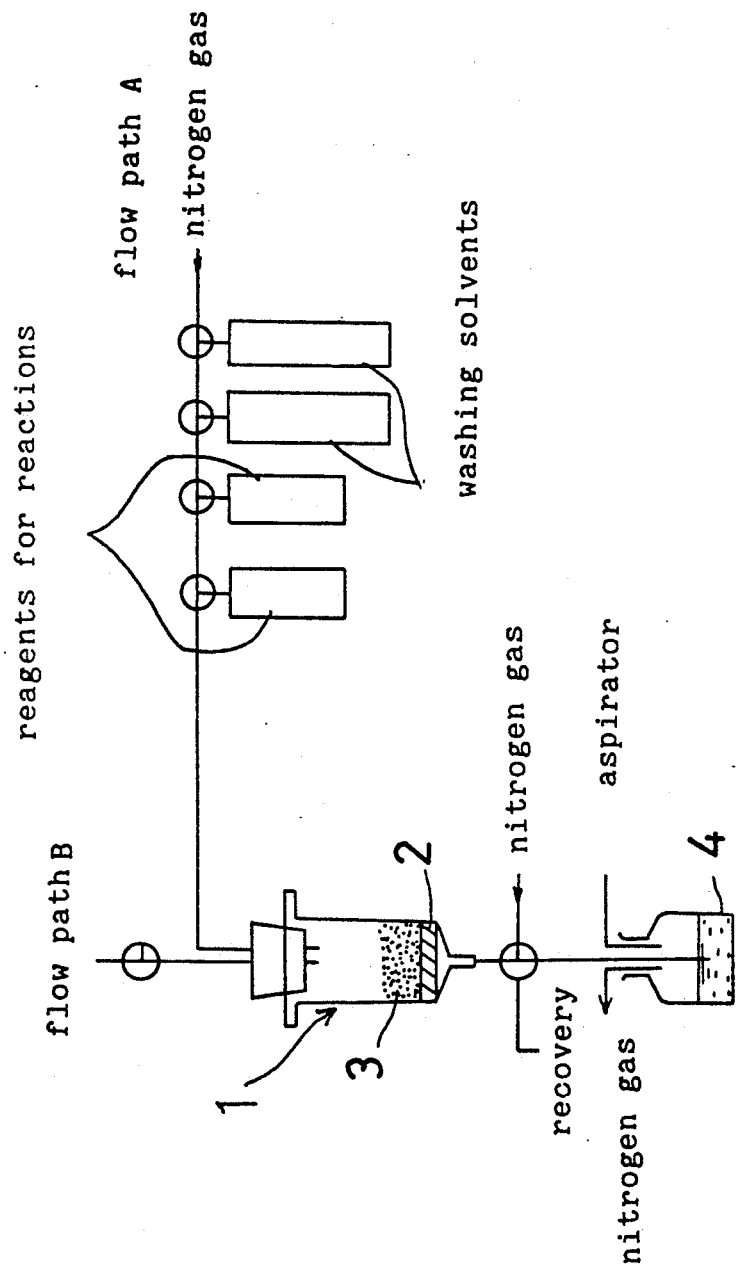
FIG. 1 is a schematic diagram of the synthesizer comprising the reaction vessel packed with a polyalkylene filter therein.

The reference numbers in FIG. 1 denote the following elements:

Element 1 is a reaction vessel, element 2 a polyalkylene filter, element 3 a solid-phase resin, and element 4 a reservoir of waste liquid.

DETAILED DESCRIPTION OF THE INVENTION

Accordingly, the present invention essentially relates to a solid-phase synthesizer having a reaction vessel comprising a polyalkylene filter packed in the bottom portion thereof.

Polyalkylene is used as the polymeric material in the filter for the reaction vessel used in the solid-phase synthesizer of the present invention. Examples thereof include polypropylene, polyethylene and polyvinylidene fluoride, with preference given to polypropylene. There is no limitation on the pore size of filter or the thickness of the filter bed packed in the reaction vessel, as long as they are in the ordinary range; for example, the pore size of filter is such that the resin, which is 200 to 400 mesh, i.e., 125 to 63 μm in size, cannot pass the filter, usually about 5 to 10 μm.

Any material can be used for the main body of the reaction vessel, as long as it is not likely to cause static electricity on the solid-phase resin; polypropylene is preferred, since it is cheap and shows little unspecific adsorption of the resulting peptide.

In the present invention, the reaction vessel is disposable, and the filter used in the present invention need not be pretreated before using the reaction vessel because it is free of the above-mentioned problem of easy clogging. For these reasons, the reaction vessel in the present invention is also suitable for automatic simultaneous multiple synthesis, and can be used as the reaction vessel in simple automated stepwise synthesizers for peptide synthesis, DNA synthesis and other syntheses.

An example application of a solid-phase synthesizer having a reaction vessel in the present invention is hereinafter described by means of FIG. 1.

FIG. 1 is a schematic diagram of the solid-phase synthesizer of the present invention, which has a reaction vessel packed with a polypropylene filter.

Reaction vessel 1 has a cut polyalkylene (e.g., polyethylene or polypropylene) filter 2 as a filter therein, on which solid-phase resin 3 is placed. At the inlet of this reaction vessel, flow paths A and B are present. From flow path A, reagents for reactions, a buffer, etc. are injected into the reaction vessel as appropriate for synthesis by means of a nitrogen gas stream. Flow path B, which is also used for exhaust gas discharge, allows manual injection of a cleavage cocktail etc. into the reaction vessel as appropriate. At the outlet of the reaction vessel, a flow path for recovery of waste liquids such as unreacted substances and washing solvents and a flow path for recovery of the desired product are present, which are mutually connected by a three-way stopcock; the waste liquids are pooled in waste liquid reservoir 4.

For example, in the solid-phase peptide synthesis wherein amino acids are added by a condensing reaction sequentially from the C-terminal to elongate the peptide chain, the reaction mixture contains an N α-deprotecting reagent, an acylating agent for peptide bond formation, etc., and methylene chloride, dimethylformamide (DMF), dimethylacetamide, N-methylpyrrolidone, methanol, t-butyl methyl ether, etc. are used as washing solvents. During the period between the Nα-deprotecting of solid-phase resin and the incorporating reaction of N-protected amino acids which are acyl components, washing solvents suitable for respective purposes are sequentially supplied to the reaction vessel while appropriately switching the valve, to remove the unreacted substances, by-products and other undesirable substances. A stirring or mixing procedure is also inserted between reaction and washing. The reaction vessel used in the solid-phase synthesizer of the present invention can be used as such without any pretreatment and allows the peptide resin, upon synthesis, to be stored therein while being dried with a nitrogen gas stream with the upper and lower parts capped or otherwise sealed. If further cleavage is performed, a cleavage cocktail such as a TFA-scavenger mixture is introduced via flow path B, and nitrogen gas is supplied little by little (or occasionally) from the lower portion of the reaction vessel with flow path B kept partially opened, to cause bubbling; after the reaction vessel is kept standing for one to several hours, nitrogen supply from the lower portion is discontinued, and nitrogen is supplied via flow path A to increase the inside pressure to recover the cocktail solution which includes the peptide cleaved from the resin support. In co-washing, a small amount of TFA is again added via flow path B, and the washing is combined with the recovered solution under a pressure of nitrogen supplied via flow path A. The residual resin, along with the reaction vessel, may be disposed.

The reaction vessel used in the solid-phase synthesizer of the present invention can be used as a disposable reaction vessel. It is free of resin adherence to the reaction vessel wall when the solid-phase resin is packed in the reaction vessel, as seen in conventional glass reaction vessels, and it requires no pretreatment such as acid treatment because clogging does not occur because of the use of a polymeric resin instead of a glass filter.

Because the use of the reaction vessel in the present invention makes it possible to conduct a number of syntheses simultaneously, it is suitable also for synthesizing the same peptide or a number of different peptides in a number of reaction vessels and for determining the optimum cleavage conditions for the same peptide by varying the amount, type, combination, etc. of scavenger. It is also suitable for simultaneously synthesizing several different peptides by different methods and evaluating these methods for synthesis.

For these reasons, provided that the reaction vessel in the present invention is operated in a computer-controllable state, it is possible to synthesize peptides, DNA, etc. partially or totally automatically and continuously. Also, the reaction vessel in the present invention is widely applicable as a reaction vessel not only for peptide synthesis and DNA synthesis but also for liquid/solid reactions, gas/liquid reactions, gas/solid reactions and so on.

Another advantage of synthesizing by reaction vessel in the present invention is that the protected peptide resin synthesized therein can be subjected to cleavage as such therein without being taken out therefrom.

The present invention is hereinafter described in more detail by means of the following examples, which are not to be construed as limiting.

EXAMPLE 1

Synthesis of human endothelin fragment (positions 3-13) undecapeptide by the stepwise method Human endothelin is a peptide having two disulfide bonds in the molecular structure thereof and comprising 21 amino acids. Its central fragment positions 3-13, which has one disulfide bond and comprises 11 amino acids, was coupled, using the reaction vessel in the present invention.

Fmoc-Tyr(Brz)-OH was incorporated to the benzyloxybenzyl alcohol resin by a standard method for a starting material. Using the reaction vessel of the present invention, Fmoc-Val-OH, Fmoc-Cys(Acm)-Glu(OBzl)-OH, Fmoc-Lys(Z)-OH, Fmoc-Asp(O2Ada)-OH, Fmoc-Met-OH, Fmoc-Leu-OH, Fmoc-Ser(Bzl)-OH, Fmoc-Ser(Bzl)-OH and Fmoc-Cys(Acm)-OH, all of which were fed manually via flow path B in FIG. 1, were stepwise incorporated in this order in the presence of N-methylmorpholine and BOP-HOBt. All the reactions were carried out in DMF; a 30% piperidine solution in DMF was used to remove $N_\alpha$-Fmoc. The reaction vessel used was made of polypropylene, packed with a polypropylene filter in the bottom portion thereof.

For all coupling reactions, not less than 99% yield was confirmed by the Kaiser test. All coupling reactions completed themselves in the reaction vessel in the present invention within 30 minutes. The side-chain-protected undecapeptide resin thus obtained was treated with 95% trifluoroacetic acid (TFA) anisole and then solidified with diethyl ether, to yield the side-chain-protected peptide H-Cys(Acm)-Ser(Bzl)-Ser(Bzl)-Leu-Met-Asp(O2Ada)-Lys(Z)-Glu(OBzl)-Cys(Acm)-Val-Tyr(BrZ)-OH almost quantitatively. The reaction vessel in the present invention was disposed while it contained recovered resin alone after cleavage was performed.

The side-chain-protected undecapeptide thus obtained (500 mg) was subjected to an HF treatment in the conventional manner. The protected peptide was cleaved by HF(7 ml) containing anisole (0.5 ml), methyl ethyl sulfide (0.1 ml) at −5° C. for 60 minutes, in the HF reaction apparatus, after which the HF was evaporated off under reduced pressure and the residue was solidified by the addition of diethyl ether. The resulting crude peptide was dried over $P_2O_5$/KOH under reduced pressure and then dissolved in TFA (2 ml). After the insoluble substances were filtered off, the solution was solidified with diethyl ether and filtered. The precipitate was dissolved in 80% acetic acid, diluted with water and lyophilized to yield 195 mg of di S-Acm undecapeptide.

The peptide thus obtained was dissolved in 100 ml of 40% acetic acid in the presence of methionine (355 mg). To this solution, 1.5 ml of 1N hydrochloric acid was added. With vigorously stirring a 0.1M iodine in methanol (13.5 ml) was added. After 40 minutes stirring the mixture was quenched with 500 mg of ascorbic acid in 100 ml of a citrate-buffer(pH 5.0) and then diluted with water to a final volume of 900 ml. This mixture was adjusted to a pH of 4.0 by the addition of 0.5% aqueous ammonia and adsorbed to a column of Diaion HP-20 (150 ml). After washing with 350 ml of water, the peptide was eluted with 0.1% TFA-acetonitrile (1:8 v/v) with monitor at 280 nm. The resulting peptide fraction was lyophilized to yield 100 mg of a free crude peptide. This crude peptide was purified by preparative C18 reversed-phase chromatography to yield 50 mg of a highly purified peptide.

The resulting purified undecapeptide gave a single peak in HPLC; the amino acid composition of acid hydrolyzate agreed with the theoretical value as below.

Asp 1.00 (1), Glu 1.13 (1), Ser 1.56 (2), Tyr 0.92 (1) Val 0.93 (1), Met 0.78 (1), Leu 0.96 (1), and Lys 1.00 (1).

Figures in parentheses are theoretically values; Cys was not determined.

Also, the desired primary structure and the desired disulfide bond were confirmed, using a gas-phase protein sequencer. FAB-MS analysis gave a mass number M+H of 1275.4, which agreed with the theoretically calculated value of 1275.5 for $C_{52}H_{82}N_{12}O_{19}S_3$+H.

EXAMPLE 2

Synthesis of Human α ANP (3-28) by the Fragment Method

Human α ANP is an atrial hormone having one intramolecular disulfide bond and comprising 28 amino acids. The fragment peptide comprising the 26 amino acid residues at positions 3-28 of human α ANP is known to possess all activities thereof. This peptide was synthesized, using the reaction vessel in the present invention.

First, before using the reaction vessel in the present invention, the protected fragment, a positions 21-28 ANP-PAM-resin, the side-chain-protected fragments of ANP(17-20), ANP(11-16) and ANP(3-10) were synthesized by a conventional stepwise method. As described above, these were prepared using the reaction vessel in the present invention partially in the synthesizing procedure.

Each side chain protected fragment was N α-Fmoc protected with C-terminal free carboxyl group.

The C-terminal protected fragment, corresponding to ANP(21-28), was separately cleaved with HF, and resulted peptide was identified as the desired product with high homogeneity by reversed-phase HPLC (single peak), FAB-MS, gas-phase sequence analysis and amino acid analysis. The side-chain-protected fragments ANP(17-20), ANP(11-16) and ANP(3-10) were prepared by the stepwise manner based on the Fmoc-Bzl strategy by manual operation using a commercially available automated peptide synthesizer or the reaction vessel in the present invention; the peptide was cleaved from the resin support with TFA, followed by the precipitation to provide highly homogeneous $N_\alpha$-Fmoc side-chain-protected peptide fragments respectively. They gave a single peak in reversed-phase HPLC, and was identified as the desired product by amino acid analysis and FAB-MS. In comparison with the use of a commercially available glass reaction vessel, the use of the reaction vessel in the present invention proved advantageous in reaction certainty and yield and more efficient.

Using the peptide resin corresponding to ANP (21-28) as the starting material, the above three fragments were incorporated successively, in the reaction vessel in the present invention resulting in an elongated peptide resin. Before acylation, the $N_\alpha$-Fmoc group of amino-component was removed with 30% piperidine in DMF.

Acylation was carried out using 2 fold excess amount of the acyl component which was dissolved in DMF by activation with Bop-HOBt. Acylation was monitored by the Kaiser test, the reaction was carried out for 2 to 5 hours. During the coupling reaction, a part of the resin was subjected to the Kaiser test to confirm more than 99% yield. Furthermore, unreacted —NH$_2$ groups were capped with 0.5 ml of a 1M acetylimidazole solution in N-methylpyrrolidone, before the next acylation. DMF was used to wash the resin throughout the assembly. After final coupling with ANP(3-10) followed by $N_\alpha$-Fmoc removal with piperidine, the peptide resin was washed with DMF, methylene chloride, methanol and t-butyl methyl ether and dried. The yield was almost quantitative.

The side-chain-protected (3-28) peptide-PAM resin thus obtained (478 mg) was cleaved with 0.5 ml of anisole, 0.5 ml of methyl ethyl sulfide and 10 ml of HF, using an HF reaction apparatus (0° C., 60 minutes). After HF was removed in reduced pressure, the residue was solidified with ethyl acetate. The precipitate was filtered and then dried over $P_2O_5$/KOH in vacuo for 1 hour. The resulting peptide was dissolved in 50 ml of 2N acetic acid and lyophilized to yield 165 mg of di S-Acm αANP (3-28), which was desalted by a column of Sephadex G-25 fine (26 dia.×770 mm) using 1M acetic acid as an eluent. The main fraction was lyophilized to yield 140 mg of an S-protected crude peptide, which was further purified by reversed-phase HPLC and identified as the desired product by FAB-MS, amino acid analysis and gas-phase sequence analysis.

EXAMPLE 3

An Example of Simultaneous Multiple Synthesis and Simultaneous Multiple Cleavage of a Number of Peptides Two kinds of enkephalin, namely H-Tyr-Gly-Gly-Phe-Met-OH and H-Tyr-Gly-Gly-Phe-Leu-OH, were simultaneously synthesized using Nα-Fmoc amino acids with Fmoc-Met-benzyloxybenzyl alcohol resin or Fmoc-Leu-benzyloxybenzyl alcohol resin as solid supports.

After removal of the Nα-Fmoc group of the amino-component with piperidine solution, 2-equivalent amounts of Fmoc amino acid as an acyl component was reacted by 2-equivalent amounts of Bop reagent and HOBt in the presence of 3-equivalent amounts of N-methylmorpholine.

After incorporation of Fmoc-Tyr(tBu)OH at the position 1 of this target peptide sequence followed by piperidine treatment, the peptide resin was washed with DMF methanol and ether and dried. The bottom portion of the reaction vessel in the present invention was closed.

A cleavage cocktail consisting of TFA anisole and ethanedithiol was added to the reaction vessel via flow path B and the mixture was bubbled by mild stream of nitrogen gas from the bottom portion of this reaction vessel.

After one hour bubbling, the TFA solution containing cleaved peptide is filtered through the bottom of this reaction vessel. The filtrate was collected into the centrifuge tube under an increased pressure exerted by supplying nitrogen gas from upper flow path B of this reaction vessel. The residual resin and the reaction vessel were disposed. The tube contained the cleaved peptide in solution of TFA with scavengers (this procedure was performed simultaneously using two tubes for each peptide). Upon addition of diethyl ether, the solution became turbid. The tube was centrifuged at 3000~3500 rpm; the supernatant was removed and the precipitate was collected. The precipitate was dried in vacuo and then dissolved in 10% acetic acid and lyophilized to yield the desired peptides. The reaction vessel used was made of polypropylene, or having a polypropylene, polyethylene filter placed in the bottom portion thereof.

EXAMPLE 4

Synthesis of Leucine Enkephalin by the Active Ester Method

Leucine enkephalin is a pentapeptide represented by H-Tyr-Gly-Gly-Phe-Leu-OH. Using Fmoc-Leu-benzyloxybenzyl alcohol resin as the starting material, 10-equivalent amounts of active esters, namely Fmoc-Phe-OPfP, Fmoc-Gly-OpfP, Fmoc-Gly-OPfP and Fmoc-Tyr(But)OH, dissolved in DMF solvent, were respectively sequentially condensed by 30 minutes of coupling reaction at room temperature, with a 30% piperidine solution in DMF used to remove Nα-Fmoc after each incorporation, to quantitatively yield an Nα-Fmoc-Tyr(But)-Gly-Gly-Phe-Leu-resin. This peptide resin was washed with DMF, methylene chloride, methanol and t-butyl methyl ether in this order and dried.

The resulting peptide resin was kept standing at room temperature for 60 minutes in a mixture of TFA, 5% anisole and 2.5% ethanedithiol, with the lower and upper portions of the reaction vessel in the present invention kept closed, after which nitrogen gas was supplied to increase the inside pressure to transfer the cleaved peptide dissolved in liquid phase from the lower portion of the syringe into a centrifugal tube. The residual resin and the reaction vessel were disposed.

To the solution containing cleaved peptide thus obtained, cold diethyl ether was added, and the resulting precipitate was collected by centrifugation at 3000~3500 rpm for 5 minutes. After being washed with diethyl ether, the precipitate was dried in nitrogen gas stream. The crude peptide was dissolved in 50% acetic acid, diluted with water up to 5 fold volume and lyophilized to yield the desired peptide. The resulting pentapeptide (leucine enkephalin) gave a single keen peak in reversed-phase HPLC. Amino acid analysis, gas-phase sequence analysis and FAB-MS gave figures agreeing well with the theoretical value; the pentapeptide was thus identified as the desired material, and no deletion peptides were co-presented. The reaction vessel used was made of polypropylene, packed with a polypropylene polyethylene in the bottom portion thereof.

This synthesis could be carried out simultaneously using multiple columns.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solid-phase synthesizer comprising a reaction vessel packed with a polyalkylene filter in the bottom portion thereof; said reaction vessel having two inlets and one outlet, and said reaction vessel being connected to three different flow paths wherein;

the first flow path being connected to one of said two inlets of said reaction vessel and being connected to a container containing a reaction reagent, and being connected to a container containing a buffer, so that the reaction reagent and buffer can be injected into said reaction vessel through said first flow path so as to synthesize a peptide in said reaction vessel;

the second flow path being separate from said first flow path and being connected to the other of said two inlets of said reaction vessel, and being connected to means for exhaust gas discharge, and to a container containing a cleavage cocktail reagent that cleaves the peptide so that a gas and the cleavage cocktail reagent can be injected into said reaction vessel through said second flow path; and the third flow path being separate from said first and second flow paths, and being connected to said outlet of said reaction vessel and being connected to a container for recovery of waste liquids and to a container for the recovery of the desired product.

2. A solid-phase synthesizer according to claim 1, wherein said polyalkylene is selected from the group consisting of polypropylene, polyethylene and polyvinylidene fluoride.

3. A solid-phase synthesizer according to claim 1, wherein a pore size of the filter is about 5 to 10 μm.

4. A solid-phase synthesizer according to claim 1 wherein each of said containers is a bottle.

* * * * *